C. C. THOMAS.
STEAM METER.
APPLICATION FILED APR. 14, 1909. RENEWED MAY 28, 1913.
1,193,488.
Patented Aug. 1, 1916.
3 SHEETS—SHEET 2.
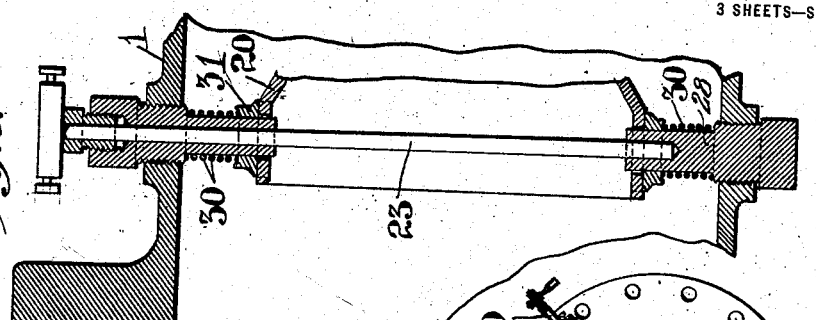
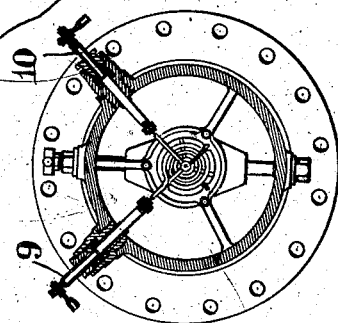
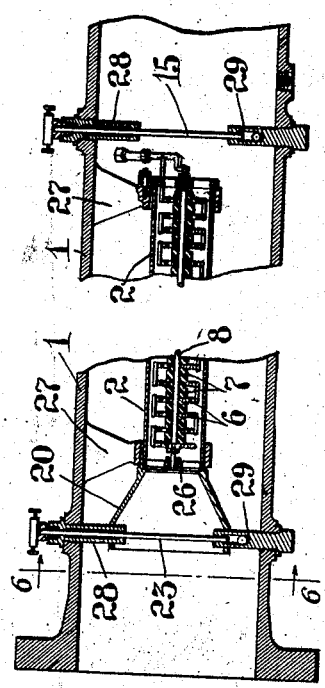
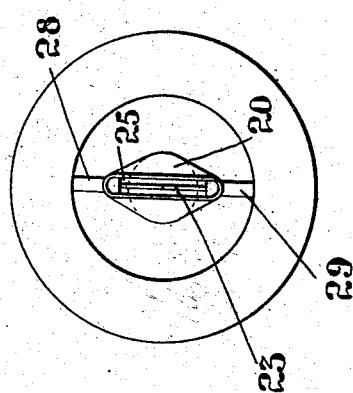
Attest:
Inventor:
by
Attys C. C. THOMAS.
STEAM METER.
APPLICATION FILED APR. 14, 1909. RENEWED MAY 28, 1913.
1,193,488.
Patented Aug. 1, 1916.
3 SHEETS—SHEET 3.
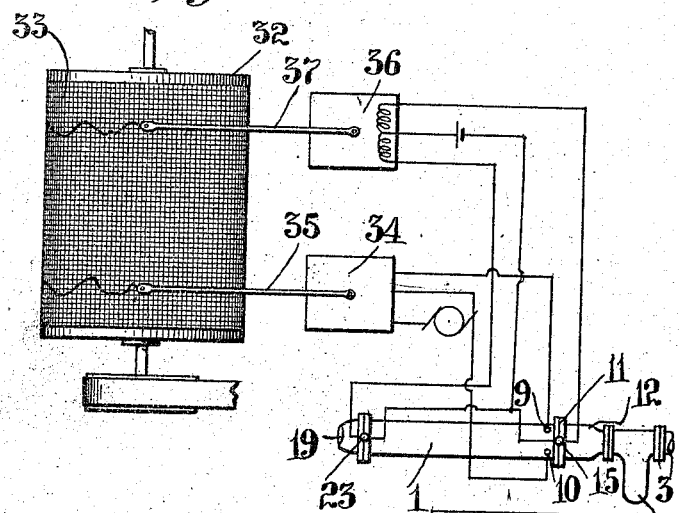
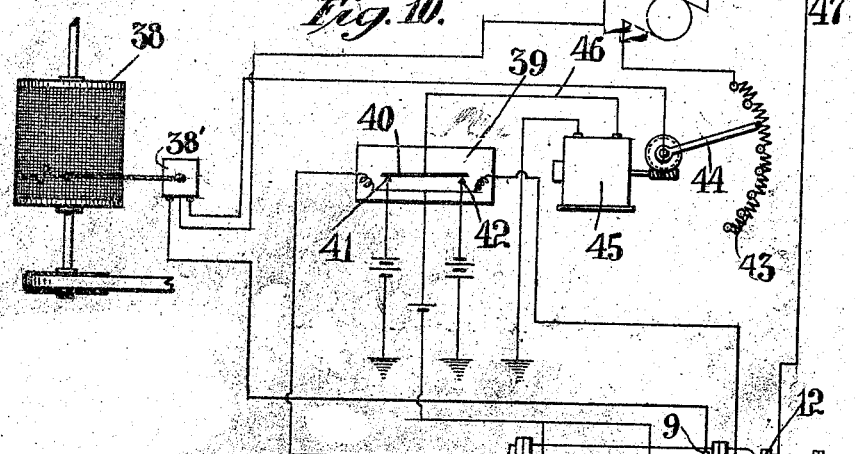
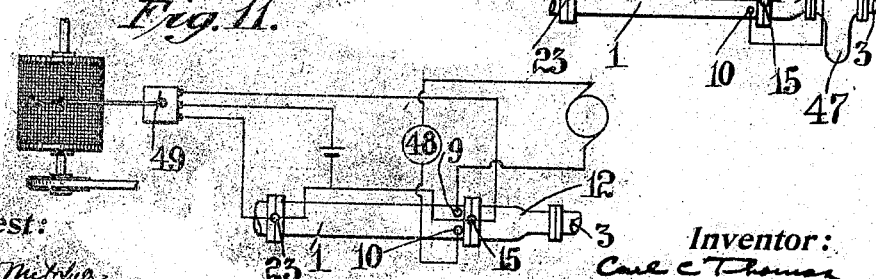
Attest:
O. Mitchel
Frank E. Hoffman
Inventor:
Carl C. Thomas
by ———— Attys

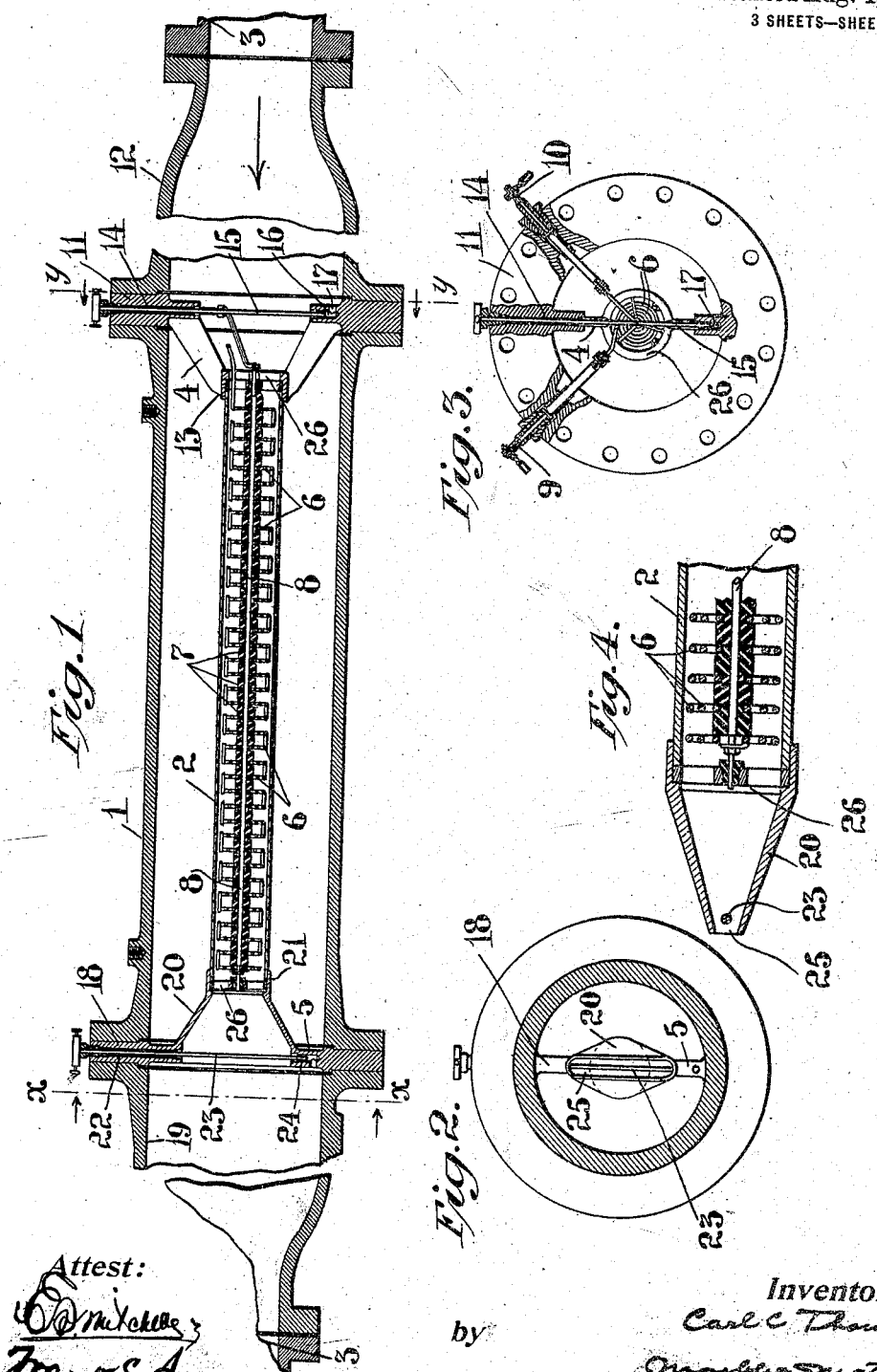

UNITED STATES PATENT OFFICE.

CARL C. THOMAS, OF MADISON, WISCONSIN.

STEAM-METER.

1,193,488. Specification of Letters Patent. Patented Aug. 1, 1916.

Application filed April 14, 1909, Serial No. 489,840. Renewed May 28, 1913. Serial No. 770,488.

*To all whom it may concern:*

Be it known that I, CARL C. THOMAS, a citizen of the United States of America, and a resident of Madison, county of Dane, and State of Wisconsin, have invented certain new and useful Improvements in Steam-Meters, of which the following is a specification.

The invention relates to meters.

It relates particularly to meters for measuring the flow of fluids such as steam, gases, vapors and the like.

The steam meter is based upon the principle that when dry vapor or gas is flowing through a conduit, a definite amount of heat imparted to said vapor or gas during the flow will cause a definite rise of temperature of the vapor or gas, such rise in temperature depending upon the specific heat of the substance flowing, its rate of flow and the rate at which energy is imparted. The rate of flow of gas by weight may thus be determined by ascertaining the rise of temperature resulting from the application of heat to the gas or vapor at a known rate. Thus, if dry steam or other gas or vapor be flowing through a conduit, and heat be imparted to such gas or vapor, at a known rate, during such flow, a definite difference between the temperature of the gas, before and after subjection to the action of the heating means, will be maintained; and if the rate of flow vary, there will be a corresponding variation in the observed difference in temperature, inversely proportional to the variation in rate of flow.

The present application embodies improvements upon the method and apparatus for measuring the flow of steam and other gases and vapors set forth in Letters Patent to Carl C. Thomas No. 946,886, dated June 18, 1910.

In the embodiment illustrated, two conduits are employed for the flow of the gas or vapor, one being smaller than the other, and such smaller conduit being located, preferably within the other. Heat is imparted to the vapor or gas flowing through the smaller conduit, and the rate at which such heat is imparted and the rise of temperature resulting, are observed. The readings thus obtained for the flow of vapor or gas through the inner conduit are proportional to the readings which would be obtained if the entire amount of vapor were heated correspondingly and the resulting rise of temperature observed. The reasons for heating a small proportional part of the gas or vapor, instead of heating the entire amount, are, that a smaller and more easily controlled amount of heat is required, and that the quality or degree of superheat of the gas or vapor as a whole, is not materially affected, so that in the case of steam operating a steam engine, for example, the engine will not, during the time the meter is in use, operate abnormally, due to abnormal superheating of the steam in the meter.

The objects of my invention are to improve the construction of steam meters and the like, and to adapt same for inclusion in steam mains and like conduits; also to avoid loss of any portion of the steam or other vapor or gas mixture.

Other objects and advantages of the invention will hereinafter appear.

I will now proceed to describe my invention with reference to the accompanying drawings, and will then point out the novel features in claims.

In said drawings: Figure 1 shows a longitudinal section of one form of my improved steam meter, constructed so as to be adapted for use as a part of a main steam line or other pipe line. Fig. 2 shows a transverse section of the device on the line $x$—$x$ of Fig. 1. Fig. 3 shows a transverse section of the device on the line $y$—$y$ of Fig. 1. Fig. 4 shows a detail longitudinal section of the discharge end of the inner conduit on a plane at right angles to the plane of section of Fig. 1. Figs. 5, 6 and 7 are views, similar to Figs. 1, 2 and 3, respectively, of an alternative form of steam meter, similar in construction but embodying different details of construction. Fig. 8 shows a detail transverse section of a portion of the steam meter illustrating alternative means for supporting the discharge nozzle thereof. Fig. 9 is a diagrammatic illustration showing a recording instrument for measuring temperature differences and current input, in connection with my improved steam meter; Fig. 10 is a similar diagrammatic view showing means for keeping constant the temperature difference produced in the apparatus and for measuring the varying current-input required to do this; and Fig. 11 is a similar view showing means for keeping the current-input constant and measuring the varying temperature difference produced, with varying rates of flow of steam, when the energy input is thus kept constant.

In the drawings, numerals 1 and 2 designate two conduits, preferably located one within the other as shown. The smaller or inner conduit 2, may be supported within the larger or outer conduit 1, in any suitable manner, and I have indicated for the purpose a spider 4 supporting the front end of the inner conduit, and another support 5 of somewhat different construction supporting the rear end of such inner conduit.

Within the inner conduit 2 are electrical resistance heating coils 6, comprising a plurality of spiral coils arranged in planes transverse to that of the axis of the conduit, surrounding a central core of insulation material 7, and connected in series. Through the center of this insulation core 7 passes another conductor 8, to which the end of the last resistance heating coil 6 is connected. The first of these heating coils, and the central conductor 8, are connected to suitable external binding posts 9 and 10. In practice the coils 6 are formed of a single length of resistance wire, continuous from one end of the conduit to the other, the coils being so supported that they are insulated both from the conduit 2 and from their supports, both terminals of the resistance conductor being at the same end of the apparatus.

The spider 4 supporting one end of the inner conduit 2, comprises a ring 11 adapted to be secured between flanges of the outer conduit 1 and a pipe section 12 (usually a reducing section) adjacent thereto; and from this ring another ring 13, within which the inner conduit 2 is received, is carried by means of the arms of the spider. This ring 11 is provided with a duct 14 through which may be passed a temperature measuring device 15, such for example as a thermometer, said ring being provided diametrically opposite the duct 14, with a socket 16 adapted to receive the end of the temperature measuring device 15. Such temperature measuring device therefore is located directly in the path of the central portion of the current of steam. The socket 16 is provided at its lower end with a vent 17, so that water of condensation may not collect in such socket. The support 5 which carries the other end of the inner conduit 2, comprises a ring 18 adapted to be secured between flanges of the conduit 1 and of a pipe section 19 adjacent thereto, and this ring 18 is provided with a flattened nozzle 20 which at its smaller end is provided with a ring 21 within which the end of the inner conduit 2 is received. This ring 18 is provided with a duct 22 for the passage of a temperature measuring device 23 similar to device 15 above mentioned, and opposite this duct 22 there is a vented socket 24 adapted to receive the end of this temperature measuring device 23. Said temperature measuring device 23 passes along the longer axis of the flattened and elongated nozzle aperture 25 (see Fig. 2); the purpose of giving the said aperture such shape being to cause all portions of the steam current to pass in close proximity to the temperature measuring device 23 after passing the heating coils 6. The central portion of the current of steam passing into conduit 1, which central portion is the portion which passes into the inner conduit 2, is presumably of uniform temperature and quality. Hence, there is no occasion for providing means at the entrance to the inner conduit 2 for passing all portions of this current of steam flowing into such conduit 2, in close proximity to the temperature measuring device 15; it is sufficient that such temperature measuring device is in the path of such inflowing current of steam. The central conductor 8 of the heating coils also forms a support for such coils, since it passes through spiders 26 of the carrying rings 13 and 21; and such support is insulated from said spiders, and is free to expand or contract with changes of temperature.

The pipe sections 12 and 19 adjacent the outer conduit 1, are commonly, though not necessarily, reducer sections, conduit 1 being customarily, though not necessarily, of greater diameter than the pipe line in which it is located. In practice the portion of pipe section 12 immediately adjacent the conduit 1 is straight for a sufficient distance to insure steady flow.

The manner of measuring quantities of steam flowing through this instrument is as follows: Steam flow being established through the instrument, the first step is to determine whether such steam is moist or whether it is superheated. If moist, considerable current may be passed through the coils 6 before the two temperature measuring devices 15 and 23 indicate different temperatures. If, however, the steam is superheated already, passage of current through the coils 6 will immediately cause the temperature measuring device 23 to indicate a higher temperature than the device 15. Some superheat of the steam is necessary, for the operation of the meter, and if the steam is not already superheated, such amount of current is passed through the coil 6 as will superheat the steam passing through the inner conduit 2, and will cause temperature indicating device 23 to indicate a higher temperature than does the corresponding device 15. A further known amount of current in addition to that already passing through the coils 6, is then passed through such coils, and the further rise in temperature caused by such additional current, is determined by means of the temperature measuring device 23. From the rise of temperature produced by the passage of the additional amount of current through the coils, the quantity of steam passing through the apparatus per unit of time, may be obtained from the equation $$W = \frac{QR}{KC_p(T_1-T_2)}$$

wherein Q=heat supplied electrically, reduced to thermal units, in addition to that required to produce initial superheat of the steam; R=ratio of total amount of steam flowing through apparatus to that flowing through the smaller conduit; W=weight of steam in pounds per unit of time $C_p$=specific heat of steam; $T_1-T_2$=temperature range, i. e., difference between the temperature indicated by temperature measuring device 23 before the additional amount of current is passed through the coils 6, and after such additional amount is passed through the coils; i. e., when superheated steam is used, the difference between the temperatures indicated by the two thermometers; K=coefficient allowing for heat losses.

In practice, the individual quantities, R, K, and $C_p$ are not individually determined, but during calibration of the instrument as a whole, W. Q. and $(T_1-T_2)$ are observed experimentally for a number of different rates of flow, and calibration curves are plotted which represents the ratio $$\frac{R}{KC_p}$$

for different steam pressures.

It will be seen that this instrument constitutes an accurate means of measuring the flow of steam and like gases and vapors, which device is devoid of moving parts, friction, etc., is not intermittent in action, and imposes practically no resistance to the passage of the steam or other gas or vapor. Ordinary steam thermometers may be used as the temperature measuring devices 15 and 23, but I prefer to use the electrical temperature measuring devices which are known in the art as electric resistance thermometers.

My improved steam meter may, of course, be made in various different forms, and may comprise numerous different details of construction. Certain alternative details of the construction I have illustrated in Figs. 5-8 inclusive. In the form shown in Figs. 5, 6 and 7 the inner conduit 2 is supported from the outer conduit 1 by means of spiders 27 projecting from the sides of conduit 1, and the temperature measuring devices 15 and 23 are introduced through bushings 28 screwed into suitable apertures in the sides of the outer conduit 1; the ends of these temperature measuring devices being received within socket-plugs 29 screwed into diametrically opposite holes in the conduit 1. In this construction the flattened and elongated nozzle 20 is structurally separate from the means for introducing the temperature measuring device 23.

In the construction illustrated in Fig. 8, the nozzle 20 is spaced away from the sides of conduit 1 by means of springs 30 which press down cover plates 31 closing the apertures through which the bushings 28 pass; expansion and contraction of the nozzle 20 being thereby permitted.

Obviously, the improved steam meter herein described is also adapted for use as a steam calorimeter for determining the proportion of moisture present in wet steam flowing through the apparatus according to the method set forth in my Patent No. 898,610.

In using my apparatus as a steam meter, as above described, if the steam to be measured has more than one or two per cent. of moisture, such steam is first passed through a steam separator of any well known efficient kind capable of reducing the moisture to uniform moderate limits.

In practice, this meter is commonly used in connection with recording devices for showing the variation and amount of both the temperature change and the watts input; these recording devices being commonly combined in one instrument, or, as an alternative, the meter is used in connection with a combined watt-recording and temperature controlling instrument, which is controlled by the temperature measuring devices of the meter so as to keep the temperature difference practically constant by regulation of the flow of current through the heating coils of the meter.

In Fig. 9 I show diagrammatically, a recording instrument such as first mentioned, comprising a rotatable drum 32 adapted to carry a record sheet 33, which is usually cross section paper of well known type, and in connection with the drum there is a watt meter 34 operating a recording needle 35, and a temperature difference indicator 36 operating a recording needle 37. The recording points of these needles are placed in line with one another, and give simultaneous records; so that the ordinates between the temperature curve and the watt curve are proportional to the amount of steam flowing at the time; and such amount of steam may be determined by reference to the calibration curves previously mentioned, that is, the quantity represented by the ordinate between the two curves multiplied by a constant taken from the proper calibration curve of the meter, gives quantitatively the rate of flow of steam flowing through the meter at the time the reading was taken.

Fig. 10 indicates diagrammatically the instrument by which the rate of the passage of current through the heating coils is regulated so as to maintain a substantially uniform temperature difference. In this figure 38 indicates a rotatable drum similar to the drum 32 of Fig. 9, and likewise adapted to carry a record sheet on which bears a recording needle controlled by the wattmeter 38'. 39 designates a temperature controlled device having a contact arm 40 arranged to be oscillated between contact points 41 and 42; this temperature controlled device 39 being controlled by the electric resistance thermometers 15 and 23 of the meter. Such temperature controlled devices adapted for control by electrical resistance thermometers, are well known. 43 represents a rheostat controlling the flow of current through the heating coils of the meter and 44 the arm of this rheostat arranged to be moved by a motor 45. Current generators of opposite polarity are connected to the contact points 41 and 42, and a conductor 46 leads from the contact arm to the motor. It will be obvious that as this contact arm is shifted owing to varying temperature difference between the thermometers 15 and 23, contact will be closed with the one contact point or the other, thus operating the motor to adjust the rheostat arm so as to reduce or increase, as may be required, the flow of current through the heating coils of the meter, to restore the temperature difference to the intended value. It is understood, of course, that the motor employed is one which is reversed by reversal of its current. By this means it is no longer necessary to read the temperatures; and reading of the watts, as indicated on the record sheet, enables a true determination of the quantity of steam flowing, from the calibration curve.

In the above description with reference to Figs. 9 and 10, it is assumed that the steam supplied to the meter is dry or superheated steam; modern steam plants almost invariably supplying dry or superheated steam. But these apparatus of Figs. 9 and 10 may also be used when the steam supplied is moist, provided the proportion of moisture be practically constant, as it will be if the steam is passed through an efficient steam separator before passing to the meter. In such case, the apparatus of Figs. 9 and 10 is used just as above described, but is used in connection with a special calibration curve in which allowance is made for the heat absorbed in bringing the steam to dry saturated condition; or, the calibration curve intended for use when the steam is dry and saturated or superheated, may be used, correction for the moisture in the steam being made by calculation. Or, when using the apparatus shown in Fig. 9, if the steam supplied contains a similar but constant proportion of moisture, a quantity of current sufficient to dry and superheat the steam and produce a difference in reading of the two thermometers, is passed through the coil and then an additional quantity of current sufficient to raise the temperature of the steam still higher is passed through the coil, thus giving a second temperature record and a second watt record. From these second records of energy and corresponding temperature rise, the quantity of steam flowing through the meter can be determined by reference to a set of calibration curves determined experimentally.

In Figs. 9 and 10, 47 designates a steam separator such as above referred to.

Instead of keeping the temperature constant and observing, or taking a record of, the energy input required to keep that temperature constant, as is done in the apparatus indicated diagrammatically in Fig. 10, I may keep the energy input constant by automatic regulation of the voltage of the heating current. Since the energy input depends directly upon the voltage and the resistance, if both of these are made constant the energy input is constant and the necessity for reading of electrical energy is eliminated. Therefore, in such case, the rate of steam flow will be inversely proportional to the observed difference of temperature $T_1 - T_2$.

In Fig. 11 I have indicated diagrammatically an apparatus operating upon this principle. In this figure, 48 designates a voltage regulator, and 49 a temperature recorder, recording the difference between the temperatures measured by the thermometers 15 and 23 respectively. The temperature differences, as so indicated, when read with respect to the suitable calibration curves, show directly the quantity of steam flowing through the apparatus.

The methods involved in the disclosures of Figs. 9, 10 and 11 are not claimed herein, and the apparatus is covered only in so far as involved in the specific disclosure of the remaining figures, said methods and the apparatus for carrying them out in its broad aspect being covered in applications Serial No. 626,679, filed May 12, 1911, and Serial No. 106,107 filed June 27, 1916.

It is to be understood that the structure shown is for the purposes of illustration only, and that other structures may be devised which come within the spirit and scope of the appended claims.

What I claim is:—

1. Apparatus such as described, comprising an outer main conduit and an inner conduit within such main conduit and spaced away from the walls thereof, said conduits adapted for proportional flow through them of steam or other gas or vapor, heating means within the inner conduit and temperature determining means upon opposite sides of such heating means, said inner conduit being jacketed by the steam or other gas or vapor flowing through the space between the inner and outer conduits.

2. Apparatus such as described, comprising two conduits located one within the other, and adapted for the flow through them of steam or other gas or vapor, the outer of such conduits comprising a plurality of sections secured together, supporting means for the inner conduit comprising rings interposed between sections of the outer conduit, and thereby supported, heating means within one such conduit, and temperature determining means upon opposite sides of such heating means.

3. Apparatus such as described, comprising two conduits located one within the other, and adapted for the flow through them of steam or other gas or vapor, the outer of such conduits comprising a plurality of sections secured together, supporting means for the inner conduit comprising rings interposed between sections of the outer conduit, and thereby supported, heating means within the inner conduit, and temperature determining means upon opposite sides of such heating means.

4. Apparatus such as described, comprising two conduits located one within the other, the interior of the inner conduit and the annular space between such inner conduit and the walls of the outer conduit, forming proportional flow-spaces, heating means within one such flow space, such flow space having a narrow discharge-orifice, and temperature-determining means upon opposite sides of such heating means, one such temperature-determining means located in the path of fluid passing through such discharge orifice.

5. Apparatus such as described, comprising in combination two conduits, one within the other, said inner conduit provided with heating means within it and also provided at its discharge end with a discharge nozzle having a narrow orifice, and temperature determining means upon opposite sides of such heating means, one such temperature determining means in the path of fluid flowing through such discharge orifice.

6. Apparatus such as described, comprising in combination two conduits, located one within the other, the outer conduit formed in sections, supporting means for the inner conduit comprising rings adapted to receive the ends of the inner conduit, and other rings connected to said first-named rings and adapted for inclusion between sections of the outer conduit.

7. Apparatus such as described, comprising a plurality of inclosures arranged for a division of flow of steam or other gas or vapor therethrough in determinate proportions, and heating means for determining the flow through one of said inclosures, said inclosures being so arranged that the one containing the heating means is jacketed by the other.

8. Apparatus such as described, comprising a plurality of inclosures arranged for a division of flow of steam or other gas or vapor therethrough in determinate proportions, and heating means for determining the flow through one of said inclosures.

9. Apparatus such as described comprising two conduits arranged for proportional flow through them at a fixed ratio of steam or other gas or vapor, heating means within one such conduit and temperature determining means on opposite sides of such heating means.

In testimony whereof I have signed this specification in the presence of two subscribing witnesses.

CARL C. THOMAS.

Witnesses:
H. M. MARBLE,
SYDNEY W. FRY.